United States Patent [19]
Hoffman et al.

[11] 3,985,391
[45] Oct. 12, 1976

[54] DISC BRAKE APPARATUS SUITABLE FOR BICYCLES

[75] Inventors: Neil R. Hoffman, Saukville; Johannes Hans Jansen, Milwaukee, both of Wis.

[73] Assignee: Brake Engineering, Inc., Milwaukee, Wis.

[22] Filed: Aug. 21, 1975

[21] Appl. No.: 606,711

[52] U.S. Cl. .............................. 301/6 V; 188/18 A; 188/26; 188/72.2; 301/6 E; 301/105 B
[51] Int. Cl.² ...................... B60B 1/00; F16D 65/12
[58] Field of Search ............... 188/18 A, 71.1, 73.2, 188/26, 218 XL, 72.2; 301/6 R, 6 A, 6 D, 6 V, 6 E, 55, 56, 59, 73, 74, 105 B

[56] References Cited
UNITED STATES PATENTS

| | | | |
|---|---|---|---|
| 348,891 | 9/1886 | Curtis | 188/26 |
| 526,317 | 9/1894 | Hendrick et al. | 188/26 |
| 618,572 | 1/1899 | Hinkley | 188/26 |

FOREIGN PATENTS OR APPLICATIONS

| | | | |
|---|---|---|---|
| 351,322 | 5/1905 | France | 301/6 V |

Primary Examiner—George E. A. Halvosa

[57] ABSTRACT

The rotor of a disc brake apparatus for bicycles comprises a spider that flatwise overlies the outer face of one spoke flange on a wheel hub and is secured by spokes that have their hook portions extending through it and that spoke flange. A flat annular disc has radially inwardly projecting tabs that are secured to the spider and hold the disc in axially spaced relation to the spokes. A U-shaped caliper body straddles an edge portion of the disc. On a shorter leg the body has a fixed brake pad; on its longer leg it carries a movable brake pad that has a compound motion for self-energization. The body is movable in directions parallel to the wheel axis and is carried, in part, by a cup-shaped adapter coaxial to the wheel shaft and confined between a bearing cone for the wheel and an adjacent frame portion. Portions of the body straddle an elongated frame member to confine the body against rotation around the adapter.

18 Claims, 9 Drawing Figures

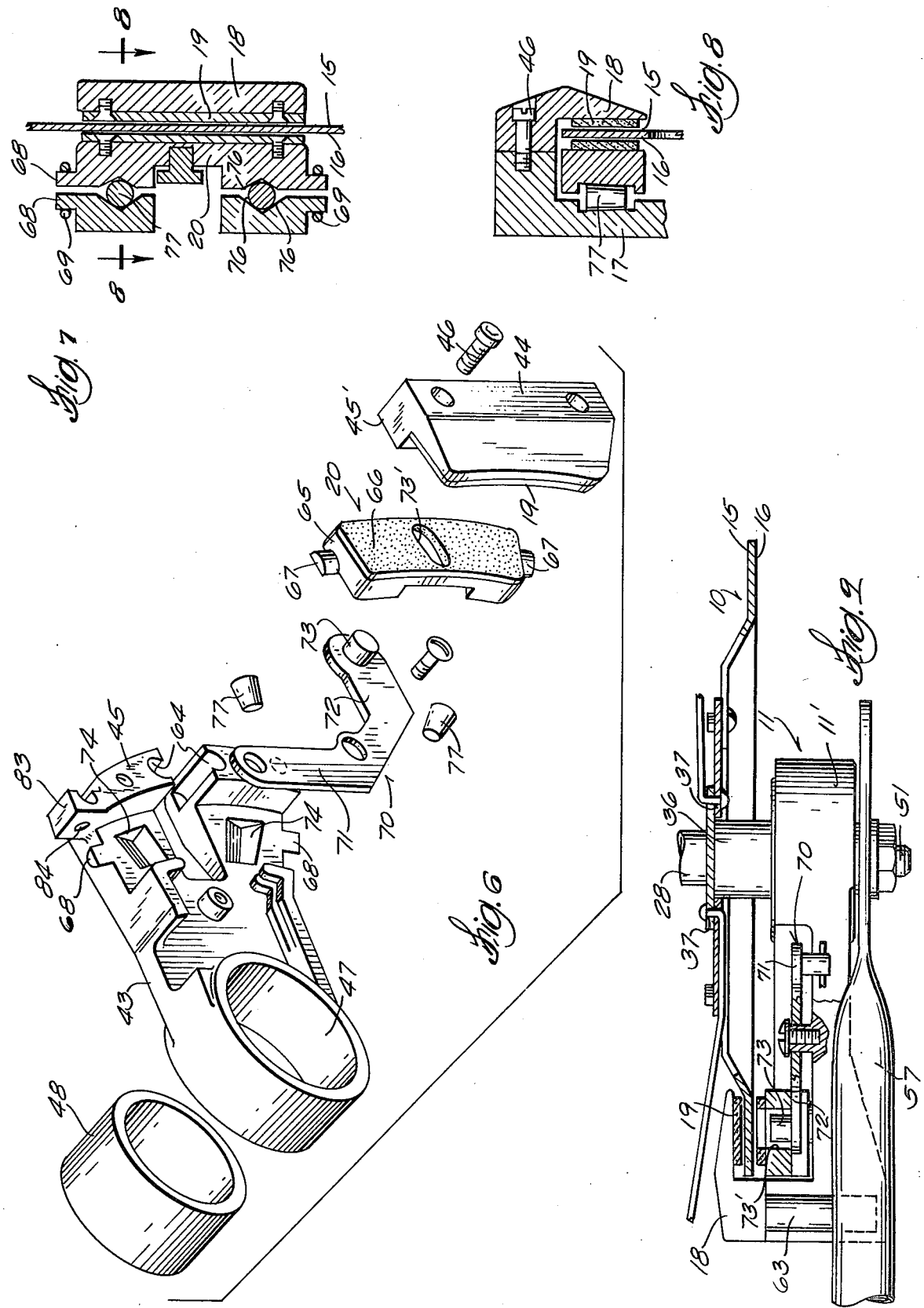

DISC BRAKE APPARATUS SUITABLE FOR BICYCLES

This invention relates to disc brake devices and is more particularly concerned with a disc-type brake assembly that is suitable for bicycles and similar vehicles.

Heretofore the customary braking system for a touring type bicycle equipped with a change-speed gear shift has consisted of a pair of hand operated caliper assemblies, one for each wheel, each comprising a pair of friction pads that clampingly engaged the rim of its wheel. Each caliper assembly was individually controllable from a hand lever on the handlebars, connected with the caliper assembly by means of a cable.

The rate at which a bicycle would be decelerated by means of a caliper brake assembly was dependent upon the clamping force applied to the friction pads, and this, in turn, depended upon the force that the rider applied to the actuating lever. Because that lever was hand actuated, the reasonably expectable maximum force that could be applied to it was on the order of 35 pounds. Some persons, of course, have hands strong enough to exert substantially more than a 35 pound clamping force, but many cannot comfortably achieve anywhere near that value.

Other things being equal, the clamping force that has to be exerted upon the friction pads of a caliper brake system in order to bring a bicycle to a stop within a given distance from a given speed depends upon the weight of the rider, who may be a child weighing 70 or 80 pounds, or an adult weighting well over 200 pounds. Obviously there is no necessary relationship between the weight of a bicyclist and the maximum clamping force that he can exert upon a brake lever.

The clamping force necessary to achieve a given deceleration with such prior brake systems also varied with the condition of the wheel rim and could be very much higher when the rim was wet than when dry.

The maximum force that could be exerted by the rider was an important consideration with prior caliper brake systems because of the need for having a rather low mechanical advantage in the actuating mechanism of the system. The rim of a bicycle wheel is seldom absolutely true. When the wheel is rotating with its axis fixed, the rim will usually be seen to have at least a slight amount of wobble or run-out, especially if it has had a certain amount of use. In the released condition of a caliper brake, both friction pads had to be spaced from the wheel rim to ensure that they did not drag against it. To accommodate a reasonable amount of run-out, the friction pads had to swing through a relatively large distance between their released and braking positions. This meant that there had to be a relatively large travel of the brake pads for a given amount of movement of the actuating lever, so that there was an unfavorable relationship between the force that the rider applied to the brake actuating lever and the resultant clamping force of the friction pads against the wheel rim.

By reason of these factors, many bicyclists did not have sufficiently strong hands to achieve optimum braking action with a caliper brake system, especially in wet weather.

By contrast, in a disc brake system having brake pads that engage a dis-like rotor, the rotor can ordinarily have sufficient rigidity to maintain flatness to within very small tolerance limits, and consequently the brake pads need to have only very small travel between their braking and released positions. This means that the actuating mechanism can be arranged for substantially greater mechanical advantage than would be feasible in a caliper brake system.

A further advantage of a disc brake system is that it can be made self-energizing to some extent. When one of the brake pads engages the rotor, friction between the rotor and the brake pad urges the brake pad in the direction of rotor rotation. Such drag of the rotor upon the brake pad can be used to increase the friction-producing force with which the brake pad engages the rotor if the brake pad is arranged for an oblique motion between its released and rotor-engaging positions, so that it has both axial and circumferential components of such motion.

Thus, as compared with heretofore conventional caliper brake systems, a disc brake system offers the very important advantage of being able to afford optimum braking action in response to relatively small actuating forces.

Another advantage of a disc brake system is that its rotor disc and brake pads can be designed to cooperate with one another for optimum braking under all conditions. In the case of prior caliper brakes that cooperated with the rim of a bicycle wheel, the material of which the rim was made had to be selected for its suitability to the functions of a wheel rim rather than for its ability to serve as a brake rotor; and, correspondingly, the material of the brake shoes had to be selected for compatibility with the rim material and could afford only such braking action as would not cause damage to the rim. It was primarily because of the need for making such compromises that prior bicycle caliper brake systems were notoriously ineffective in rainy weather, precisely at times when reduced visibilities might make good braking especially important from a safety standpoint.

By contrast, the rotor disc and brake pads of a disc brake system can be made of materials selected solely with a view to their effectiveness, compatibility and durability for braking purposes, and those skilled in the design of brake apparatus can readily achieve a disc brake system that is as effective in a cloudburst as in a drought.

Hence, a satisfactory disc brake system offers the possibility of not only greater comfort and convenience to the bicyclist but of materially greater safety as well. But, important as these advantages are, they must not be attained at the sacrifice of other desirable factors.

As with an airplane, the performance of a bicycle is very much affected by weight. Every ounce that must be added to a bicycle is cause for concern. Having in mind that a complete caliper brake system can weight less than one pound, it is apparent that a bicyclist is likely to reject a disc brake system that would be substantially heavier — notwithstanding its greater safety and convenience — in view of the fact that such a disc brake system would tax his energy almost constantly when he was riding but would offer its advantages only during short and relatively infrequent braking intervals.

It is also important that a disc brake system for bicycles be capable of being installed on a bicycle without requiring any material modification of the conventional bicycle structure, without detracting from the appearance of the bicycle, and without interfering with normal operation of the bicycle or with the installation of commonly used accessories such as luggage carriers and fenders. A particular problem in this respect is presented by the disc-like rotor that comprises an essential part of a disc brake system. The rotor must be so mounted on the wheel as to be constrained to rotate therewith and to be spaced axially to one side of all of its spokes so that both faces of the disc are accessible to brake pads on a caliper assembly which straddles an edge portion of the rotor. Nevertheless, the rotor assembly must be compact enough to fit into the small space between the wheel and the frame, and neither it nor the caliper assembly can interfere with installation or removal of the wheel or with the fore-and-aft adjustment of the rear wheel by which chain tension is maintained.

It is hardly necessary to add that a satisfactory disc brake system for a bicycle will be low in cost, sturdy, dependable and trouble free.

Having in mind these requirements, it is the general object of this invention to provide a disc brake system which is in all respects suitable for bicycles, which can be readily designed to have equally good braking action in wet and dry weather, and which is self-energizing so that optimum braking action can be obtained with very small actuating force.

Another general object of the present invention is to provide a self-energizing brake system for bicycles that is substantially safer and more convenient than the caliper brake systems heretofore conventional on gearshift bicycles, and which can be readily installed on a bicycle as a replacement for a caliper brake assembly, utilizing the same hand lever previously employed for actuation of the caliper brake assembly but requiring the exertion of substantially less force upon that lever to obtain a superior braking action.

A further object of the invention is to provide a self-energizing disc brake assembly that can be quickly and easily installed on a bicycle without the need for modifying any of the heretofore conventional bicycle structure and which can be mass produced in a single model that is adaptable to almost all bicycles, regardless of make or size.

Another and more specific object of the invention is to provide a disc brake assembly of the character described that comprises a rotor which is fixed to a wheel of a bicycle by certain of the spokes of the wheel in their cooperation with a conventional spoke flange on the wheel hub, the rotor being adapted for installation at that stage of assembly of the wheel when the majority of its spokes are already in place and are holding its hub and its rim in fixed relation to one another, and the rotor being secured to the wheel by the mere installation of the remainder of the spokes in an essentially conventional manner.

A further specific object of the invention is to provide a rotor for a disc brake system that is suitable for bicycles and similar vehicles, which rotor comprises an annular disc element and a spider element by which the disc element is secured to a wheel, the spider element being arranged to be held in place on the wheel by means of certain of the spokes thereof and the disc element being securable to the spider element by means of screws or the like, said two elements being further so arranged that they can be manufactured as inexpensive stampings, with the spider element formed from material that comes out of the inside of the annular disc element.

Another specific object of this invention is to provide a caliper assembly for a dis-type brake that is especially well suited for bicycles, which caliper assembly is held in place by nuts conventionally present on a bicycle to secure its rear wheel to one side of its frame and by bumpers or pads on the caliper assembly that have clamping but non-marring engagement with one of the longitudinal frame members of the bicycle, said caliper assembly thus being capable of being installed or removed as easily as the rear wheel itself and more or less incidentally to installation or removal of that wheel.

It is also a specific object of this invention to provide a simple disc-type brake for a wheel that normally rotates in only one direction, said disc-type brake being to some extent self-energizing and comprising a disklike rotor constrained to rotate with the wheel, a U-shaped body that straddles a portion of the rotor, a first brake pad fixed to one leg of the body, an opposing brake pad carrier on the other leg of the body for movement relative to the body out of a normal released position in a direction generally towards the first brake pad but with a component of motion in the direction of rotor rotation, and means so mounting the body on structure which carries the wheel that the first brake pad can be engaged against the rotor by reaction of the body to force which said opposing brake pad exerts against the rotor in moving away from its released position.

Still another specific object of this invention is to provide a disc-type brake assembly which is particularly suitable for bicycles and similar light vehicles and which has an actuating mechanism that is well adapted for connection with a lever intended to be actuated by the hand, said actuating mechanism comprising a cable and means by which lengthwise movement of the cable is translated into movement of a friction pad in a smooth, direct and very efficient manner.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 6 is a disassembled perspective view of the caliper body assembly;

FIG. 7 is a fragmentary sectional view taken on the plane of the line 7—7 in FIG. 2;

FIG. 8 is a fragmentary sectional view taken on the plane of the line 8—8 in FIG. 7; and FIG. 9 is a sectional view taken generally on the plane of the line 9—9 in FIG. 1 but showing a modified form of spider.

Figure 1:
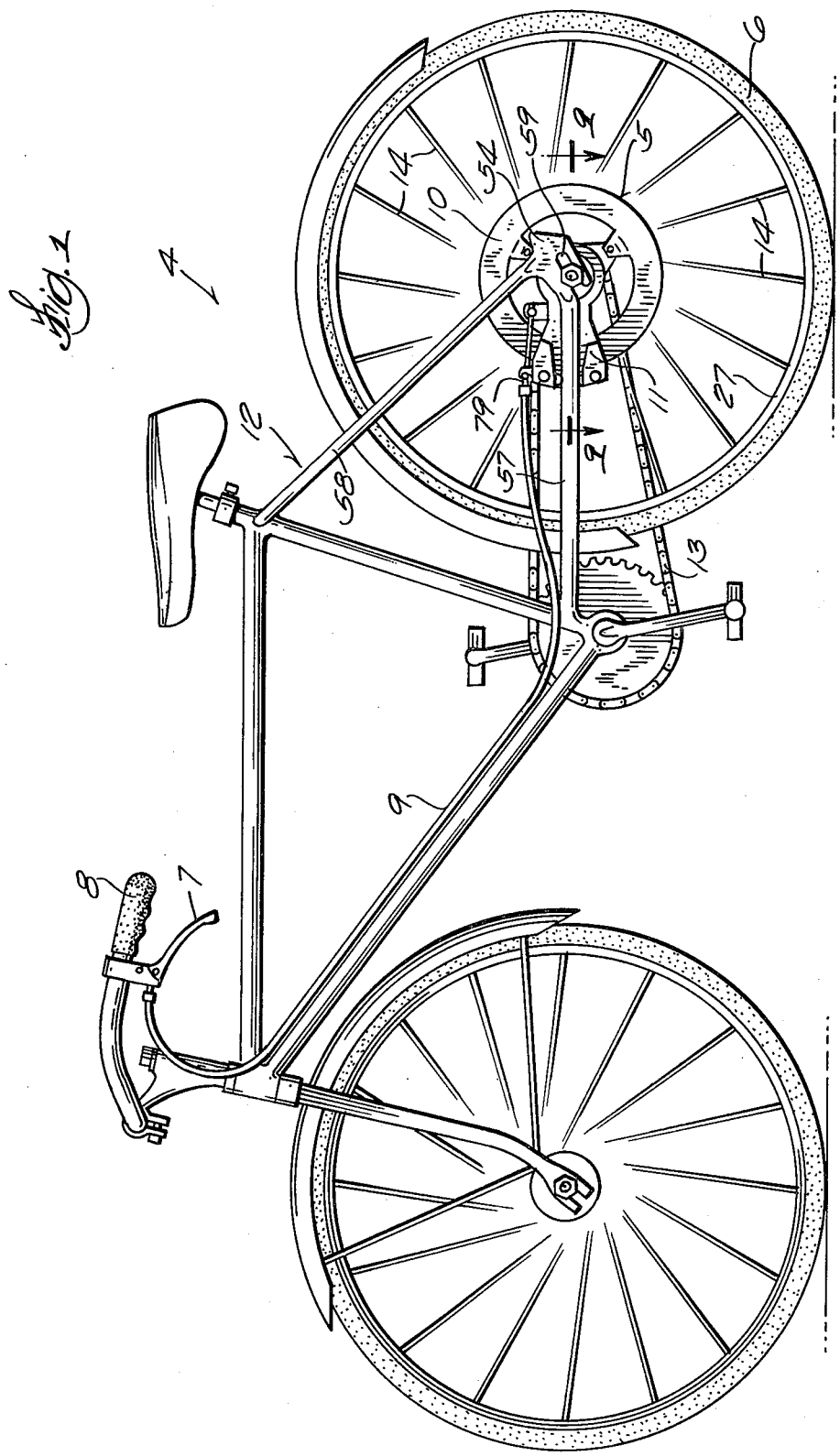
FIG. 1 is a side view of a bicycle on which is installed disc brake apparatus embodying the principles of this invention.
Figure 2:
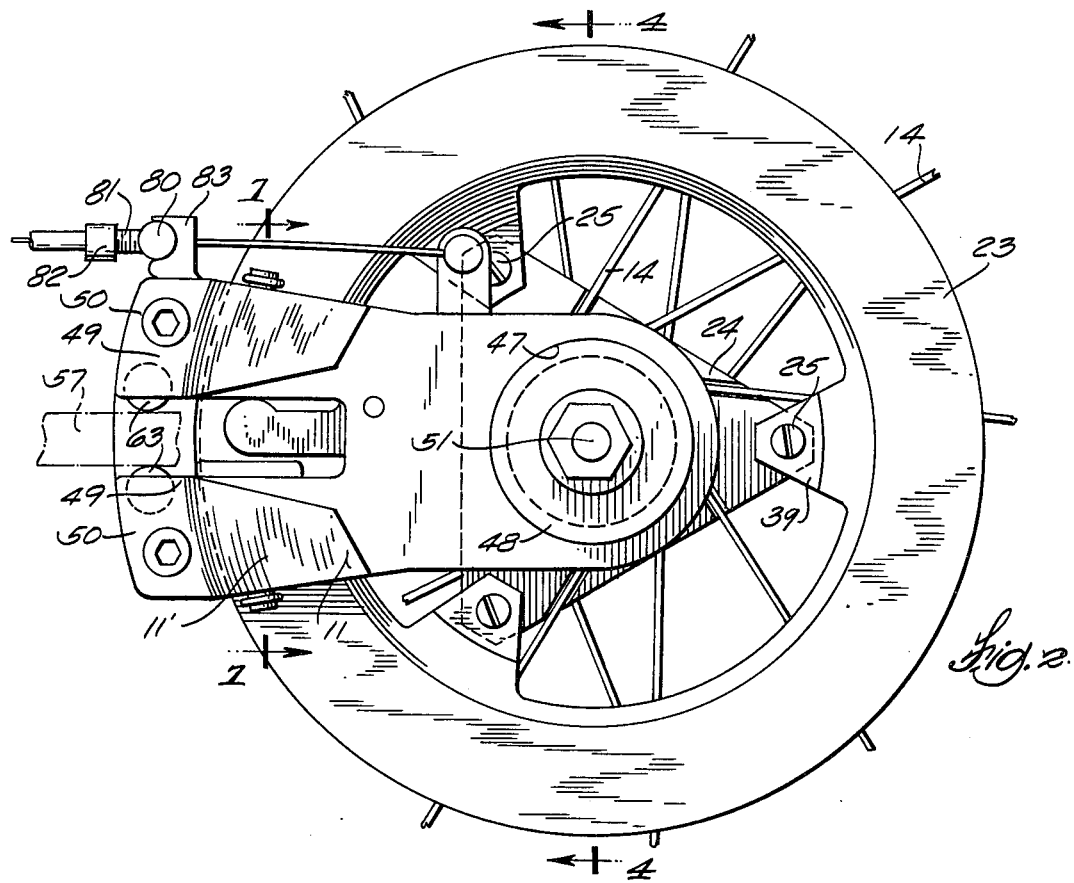
FIG. 2 is a view in side elevation of the caliper assembly of the disc brake apparatus of this invention, shown in operative relationship to its rotor.
Figure 3:
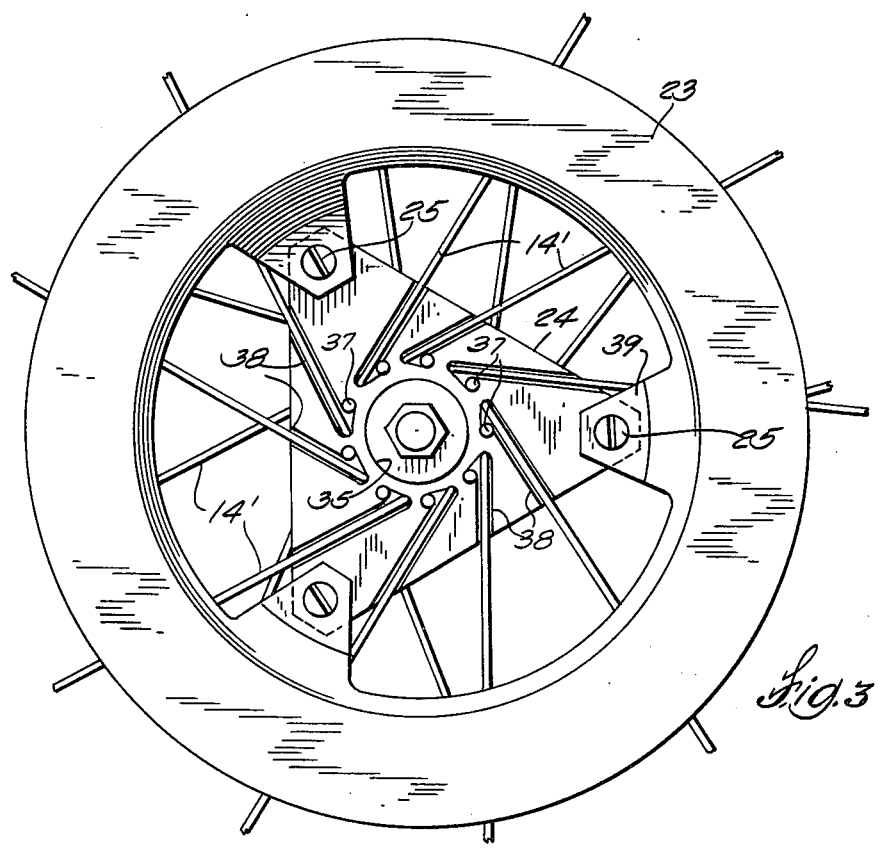
FIG. 3 is a view in elevation showing how the rotor is attached to a wheel.

Referring now to the accompanying drawings, the numeral 4 designates generally a bicycle on which there is installed disc brake apparatus embodying the principles of this invention, designated generally by 5. The brake apparatus is illustrated as arranged for cooperation with the rear wheel 6 of the bicycle and as intended for actuation by means of a more or less conventional hand lever 7 on the handlebars 8, which hand lever is connected with the brake apparatus by a cable 9.

For purposes of example the brake apparatus 5 is shown and described only as applied to the rear wheel of a bicycle, but it will be understood that the principles of the invention are readily adaptable to front bicycle wheel installations, and also to motorcycles and certain other types of vehicles, as well as generally to the braking of wheels and other rotary elements that revolve in only one direction. On a bicycle, the advantages of the invention are of particular importance with respect to the rear wheel, inasmuch as the rear wheel should normally receive more braking force than the front one.

In general the brake apparatus 5 comprises a flat, annular rotor or disc 10 that is concentric to the rear wheel 6 and is constrained to rotate with it, and a caliper assembly 11 that is secured to the bicycle frame 12 adjacent to the side of the frame that is opposite the chain 13. The rotor 10 is spaced axially to one side of all of the spokes 14 of the wheel and is between the spokes and the frame. Thus the rotor has an axially inner flat surface 15 which faces the wheel spokes and an opposite outer flat surface 16.

The caliper assembly 11 comprises a body 11' that is generally U-shaped as viewed edgewise of the rotor, but with one of its legs 17 substantially longer that its other leg 18. The body 11' straddles an edge portion of the rotor, with its longer leg 17 overlying the outer surface 16 of the rotor and its shorter leg 18 overlying the inner rotor surface 15. A relatively fixed brake pad 19 is secured to the shorter leg 18, in flatwise opposing relationship to the inner rotor surface 15; and a relatively movable brake pad 20 is carried on the longer leg 17 in opposing relationship to the outer rotor surface 16.

Contrary to generally conventional practice, the caliper body 11' is so mounted on the bicycle frame 12 (as explained hereinafter) that it can have limited motion in directions parallel to the wheel axis. The reason for such mounting of the body is to enable both of the brake pads 19 and 20 to frictionally engage the rotor 10 during brake application, even though only the brake pad 20 is movable relative to the caliper body. When the movable brake pad 20 engages the outer surface 16 of the rotor and exerts an axially inward force against it, there is of course an opposite reaction upon the caliper body by which that body is moved in the axially outward direction to carry the fixed brake pad 19 into engagement with the inner surface 15 of the rotor. Hence the freedom of the body for movement allows the brake pads to exert opposed and balanced clamping forces upon the rotor.

Turning now to a more specific description of the apparatus, and considering first the rotor 10, it comprises a flat annular member 23, which constitutes the rotor disc itself, and a substantially flat mounting portion or spider member 24 by which the disc portion 23 is secured to the wheel 6. The two members are connected by means of suitable fasteners such as bolts 25 secured by nuts 26.

For an understanding of the spider member 24 and its connection to the wheel 6, it is necessary to observe that a wire-spoked wheel such as that for a bicycle has a rim 27 that is connected by means of the elongated wire spokes 14 to a hub 28 in which bearings (not shown) are housed and to which a chain sprocket 29 may be concentrically anchored. On the hub 28 there are a pair of radially outwardly projecting circumferential spoke flanges 30, 30', one near each end of the hub, to which the spokes 14 are secured at their inner ends. Each spoke flange has a series of holes in it, at equal circumferential intervals around it. Each spoke has its inner end a short laterally projecting hook portion 31 that terminates at an enlarged head 32. This hook portion is received in one of the holes in a spoke flange, with the head 32 overlying one face of the flange and a portion of the main length of the spoke overlying the opposite face of the flange.

The spokes of the wheel are of course equally divided between the two spoke flanges. Furthermore, half of the spokes connected to each spoke flange have their heads overlying the axially inner face of that flange; the other half have their heads overlying its axially outer face. The spokes that have their heads at the axially inner face of a spoke flange, and which in part overlie its axially outer face, can be regarded as "outer" spokes 14' and are so referred to hereinafter. The remaining spokes connected with the spoke flange are inner spokes 14''. Inner and outer spokes alternate with one another around the spoke flange.

The spider member 24 flatwise overlies the axially outer face of the spoke flange 30 that is remote from the chain sprocket 29. It is secured primarily by the outer spokes 14' that are connected to that spoke flange, and it can be further secured by the heads of the inner spokes connected thereto.

As shown, the spider member is substantially flat plate in the shape of an equilateral triangle. Near each of its apexes it has a hole in which can be received one of the bolts 25 by which the disc 23 is secured to the spider. The spider also has a substantially larger hole 35 in its center, in which is received a bearing housing portion 36 of the wheel hub that extends axially outwardly beyond the spoke flange 30. Surrounding the large hole is a circle of small holes 37, one for each spoke connected to the spoke flange 30, so located as to be registerable with the holes in the spoke flange. Each small hole is large enough in diameter to receive the hook portion of a spoke. In an outer face of the spider member there are spoke receiving grooves 38, there being one such groove extending outwardly from every alternate hole 37, and each such groove extends to the outer edge of the spider member. It will be observed that the grooves 38 are lengthwise oriented in correspondence with the lengthwise orientation of the outer spokes 14' connected with the spoke flange 30.

Figure 4:
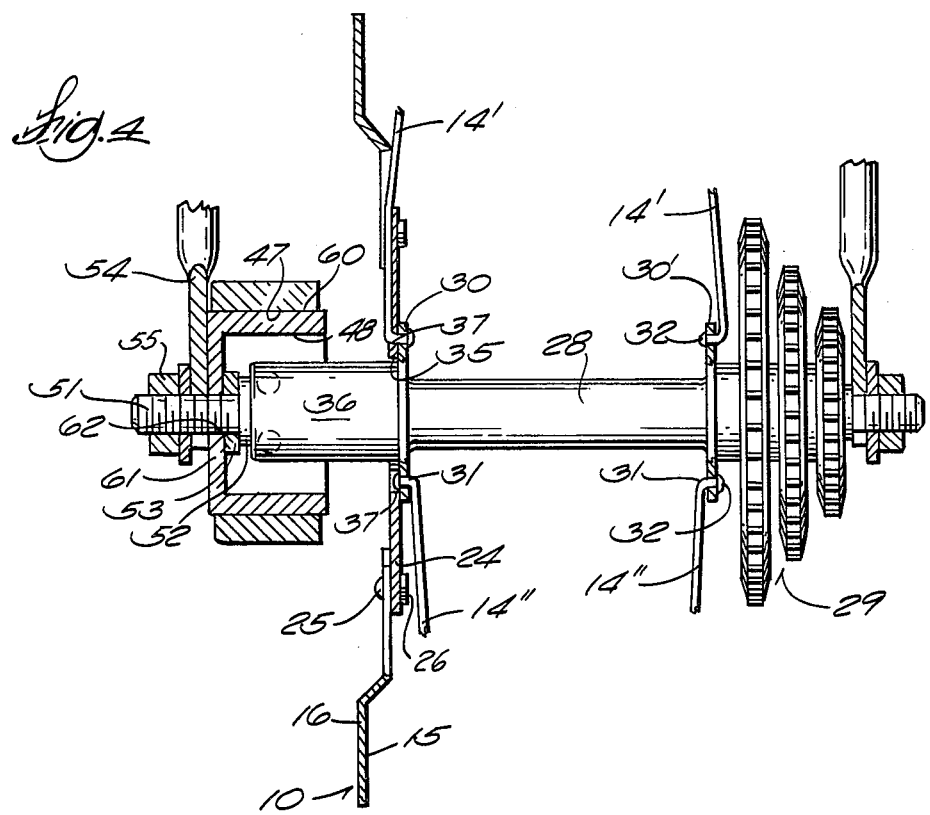
FIG. 4 is a sectional view taken on the plane of the line 4—4 in FIG. 2, on an enlarged scale.
Figure 5:
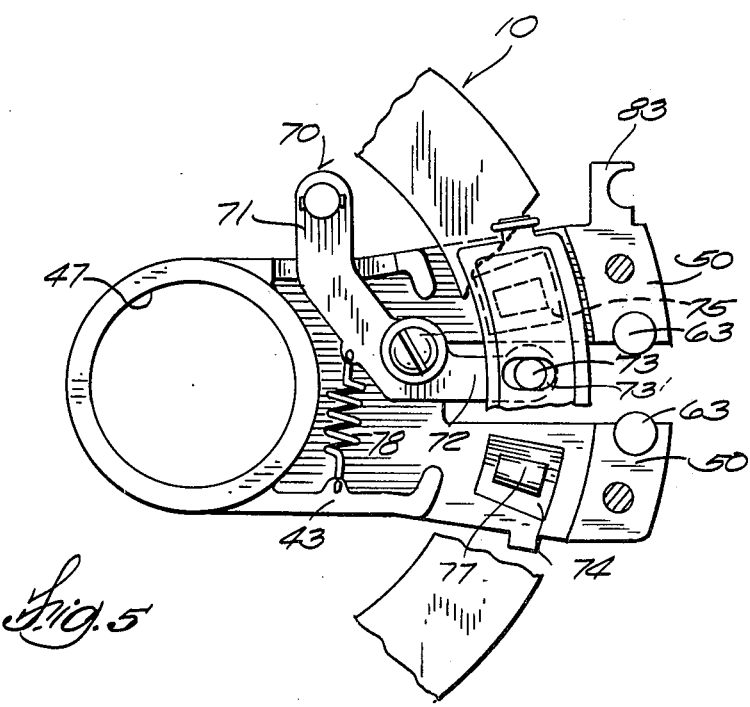
FIG. 5 is a plan view of the caliper assembly as viewed from the axially inner side of it, portions being shown broken away.

Before the spider is assembled to the wheel, all of the spokes 14 that connect with the spoke flange 30' can be installed. As shown in FIG. 4, each hole 37 in the spider can be made large enough to receive a spoke head 32, and in that case the spider can be placed on the spoke flange 30 after the inner spokes 14'' connected therewith have been installed. The heads of those inner spokes are received in those of the holes 37 from which grooves do not extend, to enable the spider to flatwise adjoin the spoke flange 30. The outer spokes 14' that connect to the spoke flange 30 are then installed in a generally conventional manner, but through the spider as well as through the spoke flange.

Alternatively, as shown in FIG. 9, the holes 37 in the spider can be made small enough so that the spoke heads 32 will not pass through them. In that case the spider is set in place on the spoke flange 30 before any spokes are connected to it, and the hook portions of all of the spokes extend through the spider as well as through that spoke flange. The spider will then be held in place by the heads on the inner spokes, as well as by the outer spokes.

In any case, the spider is flatwise contiguous to the outer face of the spoke flange 30 and has its grooves 38 opening axially outwardly.

It will be evident that the grooves 38 allow the outer spokes to extend almost in a straight line from the spoke flange 30 to the rim 27, with very little bowing due to the presence of the spider. It will also be apparent that the spider is snugly flatwise confined between the outer spokes and the spoke flange and is firmly held against rotational or other edgewise displacement by the hook portions of the spokes. The spider presents no substantial interference to conventional installation of spokes to the spoke flange 30, inasmuch as the annular disc member 23 need not be attached to the spider until after all of the spokes are installed.

The triangular shape of the spider here illustrated is related to the face that it is intended for a standard 36-spoke wheel, having nine outer spokes on its spoke flange 30, so that the apexes of the triangle can fall between outer spokes. In a wheel wherein the number of outer spokes connected to a spoke flange is not divisible by three, the spider could have a suitably different outline, to enable it to be attached to the disc 23 at locations spaced from outer spokes.

The annular disc member 23 that cooperates with the illustrated spider has three circumferentially equispaced tab-like connecting arms 39 projecting radially inwardly from its inner circumference, preferably formed integrally with its annular portion. Each of these arms is bent obliquely out of the plane of the disc, all extending in the same axial direction, but the inner end portions 40 of the several arms, which flatwise overlie the apex portions of the spider, lie in a common plane. Each inner end portion of an arm has a bolt hole which can register with a bolt hole in the spider to receive one of the bolts 25 that connect the disc member to the spider member.

Because of the axial inclination of the radially outer portions of the arms, the annular portion of the disc member that constitutes the rotor proper is in axially outwardly spaced relation to the spider and is therefore spaced a substantial distance from all of the spokes of the wheel. Hence the shorter leg 18 of the caliper body, which carries the fixed brake pad 19, is readily accommodated in the space between the rotor and the spokes.

It will be observed that the geometry of the spider member 24 and of the disc member 23 is such that both be formed as stampings, and the spider member can be made of the material cut from the inside of the disc member. Stainless steel is suitable for these parts.

As illustrated, the caliper body 11' comprises a larger main body member 43 on which the movable brake pad 20 is mounted and which provides for attachment of the caliper assembly to a bicycle frame, and a smaller body member 44 that comprises the shorter leg 18 of the U and carries the fixed brake pad 19. Both body members can be made as aluminum castings. The body members 43 and 44 have flat surfaces 45, 45', respectively, at which they join one another, and those opposingly engaged surfaces lie in a plane that substantially coincides with the plane of the rotor disc. The two body members are connected by bolts 46.

As viewed along the wheel axis, the main body member 43 is substantially elongated and is bifurcated at its end that is connected with the smaller body member 44. It has a large hole 47 through its other end. In the hole 47 there is received a cup-shaped hub adapter 48 which is fixed concentrically to the wheel and on which the caliper body has a sliding fit. As the description proceeds, it will be seen that the body is free for axial sliding motion on the hub adapter but is confined against rotation around it by abutments that comprise outwardly projecting bosses 49 on the bifurcations 50 of the main body member, which abutments engage opposite sides of one of the elongated frame members of the bicycle.

Before considering the mounting of the caliper assembly 11 in more detail, it should be pointed out that a conventional bicycle wheel assembly comprises a relatively stationary axle shaft 51 which extends coaxially through the wheel hub 28 and which has threaded end portions that project substantial distances beyond the wheel hub. On the end portion of this shaft that is remote from the sprocket, a bearing cone 52 is threaded. The bearing cone projects a distance into the hub to cooperate with a bearing (not shown) therein, and it may project axially outwardly beyond the hub. There is usually a locking nut 53 threaded onto the axle shaft against the bearing cone. The bearing cone of course does not rotate with the wheel and is thus in fixed relation to the axle shaft and the frame 12. Axially outwardly of the cone the axle shaft projects through a flat wheel supporting portion 54 of the frame. A clamping nut 55 that is threaded onto the outer end portion of the shaft, when tightened, cooperates with the bearing cone or its locking nut 53 to clamp the frame portion 54 and releasably fix the axle to the frame.

Conventionally, a bicycle frame has a V-shaped portion at each side of the rear wheel. Each such V-shaped portion comprises a lower elongated member 57 that is nearly horizontal and an upper elongated member 58 that extends down to the rear end of the lower member at a substantial inclination. The flat wheel supporting portion 54 of the frame projects generally rearwardly from the junction of these two elongated members. To enable the axle shaft to be adjusted fore-and-aft, for maintenance of chain tension, the wheel supporting portion has a slot 59 in which the axle shaft is received.

The caliper body extends forwardly from the cup-shaped hub adapter 48 to have the bosses on its bifurcated front end project across the lower elongated frame member 57, above and below the same, but the rest of the caliper body is located at the inner side of that frame member and of the wheel supporting portion 54.

The cup-shaped hub adapter 48, which supports the rear end of the caliper body, has a cylindrical side wall 60 and a substantially flat end wall 61. A concentric hole 62 in its end wall receives the axle shaft 52 with a close sliding fit, and upon securement of the wheel assembly to the frame, the end wall of the hub adaptor is clamped between the frame portion 54 and the bearing cone or its locking nut 53, being thus held against all movement by the tightening of the clamping nut 55.

The cylindrical side wall 60 of the hub adapter projects axially inwardly to surround the bearing cone 52 and has an inside diameter and depth such as to be spaced both radially and axially from rotating parts of the wheel assembly. The outer cylindrical surface of the hub adapter side wall, as already explained, provides a bearing support for the caliper body 11' that provides for translatory sliding motion of the body in directions parallel to the wheel axis.

The caliper body is of course confined against rotation about the hub adapter 48 by its straddling cooperation with the lower elongated frame member 57. To prevent scratching or marring of that frame member, and to provide for smooth, easy motion of the caliper body in directions parallel to the wheel axis, the caliper body carries, at the opposing faces of its bifurcations, pads or bumpers 63 of nylon or similar smooth, hard but slightly resilient material, each in the form of a cylinder which has its axis parallel to that of the wheel. Each bumper 63 is held captive in a slot 64 in its bifurcation, which slot opens laterally towards the other bifurcation. In cross-section each slot 64 is arcuate and of a radius equal to that of the cylinder received therein, and its side walls define slightly more than a semi-circle so that it is somewhat narrower at its mouth than inwardly thereof. The cylinder is thus confined in the slot against radial motion relative to the body 11' but projects from the mouth of the slot all along its length. At its outer end each slot is closed, which is to say that it terminates short of the outer face of the body member; but it opens at its inner end to the surface 45 of the main body member that is overlain by the smaller body member 44. Hence the cylinders 63 can be axially inserted into their slots from the inner face of the main body member, and they are confined against axial movement by securement of the smaller body member to the main body member.

It will be observed that with the hub adapter in place on the shaft 51, and with the caliper body in place on the hub adapter, the wheel can be installed on a bicycle in a conventional manner, and its axle shaft can be adjusted along the slot 59 as necessary for chain tension, all without interference from the brake apparatus.

The fixed brake pad 19 can comprise a facing member of suitable friction material secured to the leg portion 18 of the smaller body member 44 in flatwise opposing relation to the inner surface 15 of the rotor. The brake pad is somewhat rectangular in outline, being elongated in the circumferential direction of the rotor, but its longer edges are curved in arcs that center on the wheel axis so that all portions of its surface can engage the rotor.

The movable brake pad 20 comprises a block-like shoe member 65 that is of the same general shape as the fixed brake pad. A friction facing 66 overlies the surface of the shoe member that opposes the rotor. The movable brake pad is of course carried on the inner face of the main body member 43, spanning its bifurcations.

For holding the movable brake pad in place on the body, the shoe member has a pair of tabs or lugs 67, one projecting lengthwise from each end thereof, and the main body member has opposing lugs 68, one adjacent to each lug 67 on the shoe member. A coiled garter spring 69 encircles each lug 67 on the shoe member and its contiguous lug 68 on the body. The garter springs of course permit the shoe member to have limited movement relative to the caliper body, but they tend to maintain the shoe member in a normal brake-disengaged position, spaced from the adjacent outer surface of the rotor and engaged with the inner face of the main body member.

A bent lever or bell crank 70 that overlies the inner face of the main body provides for actuation of the movable brake pad. A longer arm 71 of the lever projects upwardly beyond the caliper body for connection to the cable 9, while the shorter arm 72 of the lever is confined between the shoe member 65 and the inner face of the body and is so oriented that its free end swings generally in directions circumferentially of the rotor and transverse to the length of the caliper body. An inwardly projecting pin 73 or the like, fixed on the free end of the shorter lever arm 72, rides in a closely fitting slot 73' in the shoe member to transmit motion of that lever arm to the movable brake pad. It will be seen that forward motion of the longer lever arm 71, in response to tension on the cable 9, causes the movable brake pad to move along a path and in a direction which correspond to normal movement of the portion of the rotor engaged by the movable brake pad. It will also be noted that the relationship of the shorter and longer arms of the bent lever 70 is such that the brake pad has a relatively small movement in response to a relatively large movement of the cable, so that a small force on the handlebar actuator lever 7 is translated into a large force on the brake pad.

The brake applying motion of the movable brake pad is a compound one in which the brake pad has one component of motion along an arcuate path defined by the curvature of its longitudinal edges and has another component of motion axially toward the rotor; but in such motion the brake pad is always maintained in an orientation such that its friction surface is parallel to the surfaces of the rotor. To cause the brake pad to have such an axial component of motion while it is maintained in the orientation just mentioned, the caliper body member 43 and the shoe member 65 have pockets 74 and 75, respectively, that open towards one another and define cooperating ramp surfaces. There are two such pockets 74 in the caliper body, one in the inner face of each of its bifurcations, and two pockets 75 in the shoe member, spaced and located to open into the pockets 74. As best seen in FIG. 7, each pocket is of substantially V-shaped cross-section, to provide a pair of oppositely inclined ramp surfaces 76. The two inclined surfaces of each pocket converge towards a plane that contains the axis of the wheel, so that as viewed in plan the two pockets are in somewhat splayed relation to one another. Furthermore, each pocket diminishes in depth toward the wheel axis (that is, rearwardly), and since the ramp surfaces 76 of the pocket are flat, each pocket is slightly fan-shaped and forwardly divergent as viewed in plan.

A tapered roller 77 is confined in each pair of opposing pockets, to cooperate with the opposite ramp surfaces 76. The largest diameter end of the roller is in the deepest portion of the pocket, and the taper of the roller is such as to correspond to the depthwise taper of the pockets so that the desired orientation of the brake pad friction surface is maintained.

It will be apparent that as the movable brake member is moved lengthwise by swinging of the lever 70, the rollers 77, confined between the opposing ramp surfaces of the respective pockets 74 and 75, will cooperate with those ramp surfaces to impart to the shoe member a component of motion away from the caliper body member 43 and towards the rotor.

It will be understood that the angle of taper of the rollers and pockets is so selected as to cause the brake pad to move in an arc corresponding to the path of motion of the portion of the rotor that it engages. For purposes of clarity the taper of the rollers and pockets is exaggerated in FIG. 6.

Attention is directed to the fact that the two rollers 77 cooperate with the respective ramp surfaces in the pockets 74 and 75 to provide a support for the movable brake pad that is totally stable and by which it is maintained properly oriented at all times, and that they guide the movable brake pad for motion in the proper directions but permit it to have nearly frictionless motion relative to the caliper body.

When the movable brake pad contacts the rotor, frictional drag of the rotor upon the brake pad tends to drive the latter farther in the brake applying direction and thus more forcefully into engagement with the rotor, to afford a degree of self-energization of the brake. It will be appreciated that the angle of inclination of the ramp surfaces 76 of the pockets will control the relationship between the components of arcuate and of axially inward motion of the brake pad, and hence will control the degree to which self-energization is afforded. While some amount of self-energization action is highly desirable, it should not be excessive lest the braking action be lacking in "feel" and have a tendency to cause wheel locking.

The manner in which the fixed brake pad 19 is caused to engage the rotor, due to movement of the caliper body in reaction to force that the movable brake pad exerts against the rotor, has been described above.

A tension spring 78, reacting between the bent lever 70 and the main body member, biases that lever in the direction opposite to that of brake application. That tension spring therefore cooperates with the garter springs 69 to urge the movable brake pad towards its normal position in which its friction surface is slightly spaced from the rotor.

No special provision is made for disengaging the fixed brake pad 19 from the rotor when the brake is released, and none is necessary. The body has been found to move back promptly to a position in which the fixed brake pad is clear of the rotor. Evidently the very slight amount of runout that is inevitably present in the inner surface 15 of the rotor is sufficient to kick the body to its brake-disengaged position during the first revolution of the wheel following brake release.

For smooth brake application it is essential that the cable 9 as well as other parts of the brake actuating mechanism shall have a free and efficient action. To this end, the rear end portion of the cable extends through a self-aligning cable guide 79 by which it is maintained oriented as nearly as possible at right angles to the lever arm 71 to which it is connected. The cable guide comprises a cylinder 80 of nylon or the like having a metal tube 81 extending transversely therethrough that receives the cable with an easy sliding fit. As is conventional, a sheath in which the cable is enclosed has a detachable connection 82 to the front end of the guide tube 81. The cylinder 80 is supported by a lug 83 that projects upwardly from the top of the main body member 43 near its front end. An arcuate groove in the front face of the lug receives the cylinder with a fit that allows the cylinder to rotate easily. The portion of the cable that extends to the rear of the guide tube 81 passes through a bore 84 in the lug 83 that is sufficiently larger in diameter than the cable to accommodate substantial lateral motion thereof. Note that the lug 83 so locates the cable guide that the rear end portion of the cable is substantially at right angles to the arm 71 of the bent lever when that lever is in the brake-disengaged position to which it is biased.

From the foregoing description taken with the accompanying drawings it will be apparent that this invention provides disc brake apparatus which is nicely adapted for bicycle applications by reason of its light weight, compactness and efficiency, and which brings an unprecedented convenience and safety to hand-operated bicycle braking. It will also be apparent that the apparatus of this invention is very versatile in that it can be installed on practically any make, model or style of bicycle without requiring any modification of the bicycle structure, without detracting from the appearance of the bicycle and without interfering in any way with its normal operation or with the installation on it of commonly used accessories.

Those skilled in the art will appreciate that the invention can be embodied in forms other than as herein disclosed for purposes of illustration.

The invention is defined by the following claims:

We claim:

1. A unitary mounting member for securing a rotor disc for a disc-type brake assembly to a wheel of the type having a hub on which there is a circumferential spoke flange with axially opposite inner and outer surfaces, said hub being connected with a rim by means comprising certain wire spokes each of which has a transverse hook portion received in one of a plurality of circumferentially spaced holes in said spoke flange, an adjacent portion that overlies said outer surface of said spoke flange and a head that overlies the inner surface of said spoke flange, said mounting member being characterized by:
   A. a substantially flat, plate-like central portion in which there are a plurality of holes, one for each of said certain spokes, said holes being so centered on a circle and spaced from one another therearound as to be arranged to register with said holes in said spoke flange and being of a size to receive the hook portions of said certain spokes so that the mounting member can be confined against edgewise displacement relative to the wheel by said hook portions while being axially confined between said outer face of said spoke flange and said adjacent portions of said certain spokes;
   B. said mounting member having securement portions that are spaced radially outwardly from said central portion and spaced circumferentially from one another and to which a rotor disc can be rigidly fastened in axially outwardly spaced relation to said central portion of the mounting member.

2. The mounting member of claim 1 wherein said securement portions are substantially coplanar with said central portion and project radially outwardly therefrom, further characterized by:
   C. said mounting member having elongated grooves in an outer face thereof, each of said grooves extending lengthwise from one of said holes in the mounting member to an outer edge portion thereof and being so oriented along its length that one of said certain spokes can have its said adjacent portion lengthwise received therein.

3. The mounting member of claim 1, for a wheel wherein other similar spokes are received in other circumferentially spaced holes in said one spoke flange and have their heads overlying the axially outer surface thereof and their said adjacent portions overlying its axially inner surface, further characterized by:

said central portion of the mounting member having other holes therethrough which have their centers on said circle and which are so spaced from one another and from the first mentioned holes therein as to register with said other holes in said spoke flange, said other holes in the mounting member being large enough to receive the heads of said other spokes so that the mounting member can flatwise engage said outer surface of said spoke flange.

4. The mounting member of claim 1, for a wheel wherein other similar spokes are received in other circumferentially spaced holes in said one spoke flange and have their heads overlying the axially outer surface thereof and their said adjacent portions overlying its axially inner surface, further characterized by:

said central portion of the mounting member having other holes therethrough which are so spaced from one another and from the first mentioned holes therein as to register with said other holes in said spoke flange, said other holes in the mounting member being large enough for said other spokes to pass lengthwise therethrough but too small to pass the heads of said other spokes so that the heads of said other spokes can overlie said mounting member to cooperate with said certain spokes in axially confining the mounting member against the outer face of said spoke flange.

5. A rotor for a disc-type brake assembly, concentrically securable to a bicycle or similar wheel that has a hub on which there is a circumferential spoke flange with axially opposite inner and outer faces, said hub being connected with a rim by means comprising certain spokes, each of which has an inner portion that overlies the outer face of said spoke flange, a hook portion that extends through one of a plurality of circumferentially spaced holes in said spoke flange and a head that engages the inner face of said spoke flange, said rotor comprising:

A. a flat, radially outer annular element;
B. a substantially flat radially inner spider element having a plurality of holes therethrough, said holes being so spaced from one another as to be registerable with said holes in said spoke flange so that the hook portions of said certain spokes can extend through said holes in the spider element as well as through said spoke flange, to anchor the spider element against edgewise movement relative to the wheel and to enable the spider element to be flatwise confined between said inner portions of said certain spokes and the outer face of said one spoke flange; and
C. rigid, circumferentially spaced members extending between the annular element and the spider element and connecting said elements with one another, said members fixing the annular element in surrounding relation to the spider element but in axially offset relation thereto so that the annular element is spaced axially outwardly from said certain spokes when the rotor is installed on a wheel.

6. The rotor of claim 5, further characterized by: said spider element having elongated grooves in its surface that faces the annular element, each groove extending lengthwise from one of said holes in the spider element to an edge thereof, said grooves being adapted to receive said inner portions of said certain spokes so that those spokes can extend substantially straight from said spoke flange to the rim.

7. The rotor of claim 6, for a wheel having other spokes which overlie the inner face of said spoke flange and have their heads engaging the outer face thereof, further characterized by:

said spider element having other holes that are so spaced from one another and from the first mentioned holes therein as to register with the holes in said one spoke flange in which the hook portions of said other spokes are received, said other holes in the spider element being large enough in diameter to receive the heads on said other spokes so that the spider element can flatwise engage the outer face of said one spoke flange.

8. The rotor of claim 6, for a wheel having other spokes which overlie the inner face of said spoke flange and have their heads engaging the outer face thereof, further characterized by:

said spider element having other holes that are so spaced from one another and from the first mentioned holes therein as to receive the hook portions of said other spokes, said other holes in the spider element being small enough so that the heads on said other spokes cannot pass through them, the spider element thus being securable against edgewise and flatwise displacement relative to a hub by the hook portions and heads of said other spokes as well as by said certain spokes.

9. The rotor of claim 5 wherein said holes in said spider element have their centers on a circle and at uniform distances from one another around said circle, further characterized by:

said spider element having an aperture therein which is concentric to said circle and through which can project an axle shaft for a wheel on which the rotor is installed.

10. The rotor of claim 5 wherein said annular element and said spider element are formed as separate parts, and wherein said connecting members comprise radially inwardly projecting tabs on the annular element that have their radially inner portions disposed in a common plane that is spaced from the plane of said annular element, further characterized by:

D. detachable fasteners for securing said tabs to the spider element with said radially inner portions of said tabs flatwise overlying portions of the spider element, the detachability of said fasteners enabling the spider element to be installed on a wheel without interference from the annular element.

11. A wheel assembly for a bicycle or the like, comprising a rim connected with a hub by means of wire spokes, and a flat, substantially annular rotor for a disc-type brake, which rotor is concentrically secured to the wheel and constrained to rotate therewith, the wheel further comprising a circumferential spoke flange on the hub that has axially opposite inner and outer faces and has circumferentially spaced holes therethrough in which are received hook portions on the inner ends of spokes, at least certain of the spokes being arranged to overlie the outer face of said spoke flange and having heads on their hook portions that engage the inner face thereof, and the hub further having a bearing portion that projects axially outwardly beyond the spoke flange, said wheel assembly being characterized by:
- A. a substantially flat spider element having an aperture through which said bearing portion on the hub projects, said spider element being flatwise confined between said certain spokes and the outer face of said spoke flange and having cirumferentially spaced holes therethrough, around said aperture, which register with holes in the spoke flange and wherein the hook portions of said certain spokes are also received to confine the spider element against rotation relative to the wheel; and
- B. rigid connecting elements extending between said spider element and the rotor to secure the rotor to the spider element in concentric relation to the wheel, said connecting elements being disposed at circumferentially spaced intervals around the rotor and projecting axially to one side of the rotor to dispose the rotor in axially outwardly spaced relation to the spider element and said certain spokes.

12. The wheel assembly of claim 11 wherein other spokes that have their hook portions engaged in holes in said spoke flange overlie the inner face of said spoke flange and have their heads engaging the outer face thereof, further characterized by:
- C. the spider element having other circumferentially spaced holes around said aperture in which the heads on said other spokes are received so that the spider element flatwise engages the outer face of said spoke flange.

13. The wheel assembly of claim 11, further characterized by:
- D. the spider element having elongated grooves in the axially outer surface thereof, each of which extends lengthwise from one of said holes to the edge of the spider element, each of said grooves accommodating a portion of one of said certain spokes.

14. The wheel assembly of claim 11, further characterized by:
1. said spider element being substantially triangular in outline and having a fastener hole in each of its apex portions;
2. said connecting elements being formed integrally with the rotor as three arms which project radially inwardly from its inner circumference and obliquely to one axial side thereof, and which have flat inner end portions that lie in a common plane spaced from the plane of the rotor; and
3. removable securement means extending through said fastener holes in the spider element and through aligned holes in the inner end portions of said arms to flatwise secure the inner end portions of said arms to the apex portions of the spider element.

15. The wheel assembly of claim 14 wherein the maximum distance across the spider element is not greater than the inside diameter of the rotor, so that the spider element and the rotor can be stamped from a single sheet of material, with material that comes out of the rotor being used for the spider element.

16. The wheel assembly of claim 11 wherein other spokes that have their hook portions engaged in holes in said spoke flange overlie the inner face of said spoke flange and have their heads engaging the outer face thereof, further characterized by:
- C. the spider element having other circumferentially spaced holes around said aperture in which the hook portions of said other spokes are received, said other holes in the spider element being small enough so that the heads on said other spokes cannot pass therethrough.

17. Mounting means by which a rotor for a disc-type brake assembly can be secured to a wheel comprising a hub on which there is a circumferential spoke flange with axially opposite inner and outer surfaces, said spoke flange being connected with a rim by means of inner and outer wire spokes, each of said spokes having at one end thereof a transverse hook portion which extends through one of a plurality of circumferentially spaced holes in said spoke flange, each inner spoke having a head on its hook portion that overlies said outer surfaces of the spoke flange and each outer spoke having a similar head that overlies the inner surface of the spoke flange, said mounting means comprising:

a substantially flat, plate-like mounting member having
- a. a large central hole therethrough into which an axially outer portion of a hub can project,
- b. a plurality of smaller holes therethrough that are so spaced from the edge of said central hole and from one another as to be able to register with said holes in said spoke flange of the hub, said smaller holes being at least large enough to receive the hook portions of outer spokes connected with said spoke flange and a part of each inner spoke connected therewith, so that said outer spokes can confine the mounting member flatwise against the outer surface of the spoke flange,
- c. elongated grooves in an axially outer surface of the mounting member, extending lengthwise to the outer edge thereof from those of said smaller holes therein in which the hook portions of outer spokes are received, and
- d. securement portions spaced circumferentially from one another and projecting radially outwardly from the portion of the mounting member in which said smaller holes are located, said securement portions comprising means for rigidly securing a flat rotor to the mounting member with the rotor concentric to the mounting member and in axially outwardly spaced relation to said surface of the mounting member.

18. A wheel assembly for a bicycle or the like, comprising a rim connected with a hub by means of wire spokes, and a rotor concentrically secured to the hub for rotation with the wheel and having axially oppositely facing flat surface which are clampingly engageable by brake pads, said wheel assembly being characterized by:
- A. the rotor comprising two separate parts,
1. one of said parts being a securement member in which there are a plurality of holes, in each of which holes one of said spokes is received to provide a connection between said spokes and the securement member, said securement member further having
   - a. an axially outer face which is overlain by at least certain of the spokes received in said holes, and
   - b. securement portions spaced radially outwardly from said holes; and 2. the other of said parts substantially comprising a flat annulus having said flat surfaces thereon; and
B. means separably connecting said two parts and holding them in axially offset relation to one another with said annulus spaced axially outwardly of said certain spokes as well as from the securement member, the last mentioned means comprising
   1. circumferentially spaced projections on said annulus, extending from its inner circumference, and
   2. fastening means detachably securing said projections to said securement portions on the securement member, the detachability of the annulus from the securement member providing for connection of spokes with the securement member without interference from the annulus.

* * * * *